J. P. Meranda.
Churn.
N°. 106,475. Patented Jul. 19, 1870.
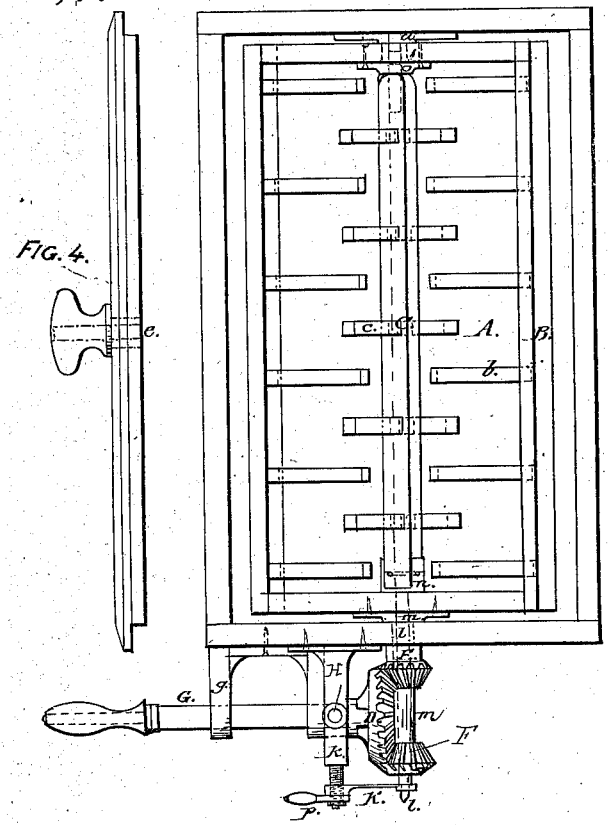
FIG. 1.
FIG. 4.
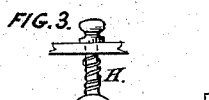
FIG. 3.
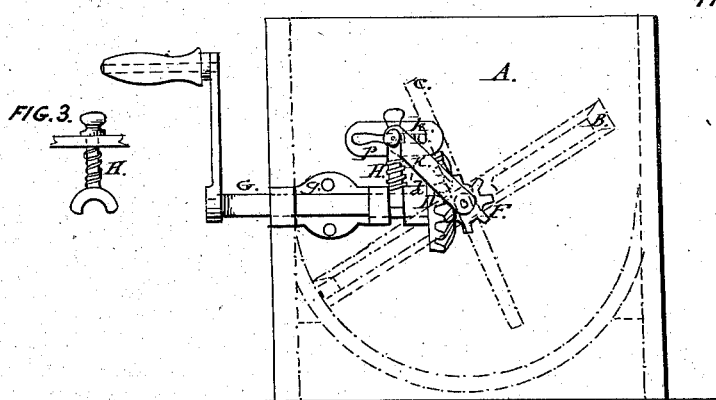
FIG. 2.
WITNESSES:
B. A. Converse
J. Engensperger
INVENTOR:
J. P. Meranda.

United States Patent Office.

J. P. MERANDA, OF SPRINGFIELD, OHIO.

Letters Patent No. 105,475, dated July 19, 1870.

IMPROVEMENT IN CHURNS.

The Schedule referred to in these Letters Patent and making part of the same.

*To all whom it may concern:*

Be it known that I, J. P. MERANDA, of the city of Springfield, in the county of Clark and State of Ohio, have invented certain new and useful Improvements in Churns; and I hereby declare that the following is a full, clear, and exact description thereof, reference being had to the annexed drawings and to the letters of reference marked thereon, in which similar letters indicate like parts.

My invention consists in a churn of novel and peculiar construction, with two sets of alternating beaters, revolving in opposite directions and driven by beveled gear, of compact form, one set of the beaters attached to the inner shaft, and the other to an outer or hollow shaft, each shaft having a pinion upon it, which meshes into the driving-wheel, making the machine not only double-geared, but producing motion in opposite directions, thereby agitating the cream more thoroughly, and separating the butter globules in the least possible time. The two short shafts upon which the pinions are mounted are each provided with square ends, which fit into recesses of similar shape in the ends of the beater-racks (which have metal plates upon them) next the gear end of the churn.

The other ends of these racks have small journals, upon which they revolve.

A thimble or sleeve is fitted into the end of the churn, through which the shafts work. These are supported in place by a spring supporter, one end of which screws upon a projecting arm, while the other end rests upon the end of the inner shaft, a hole in the end of the spring forming a collar, to support the shaft, and keep it in position.

The spring supporter is kept tightly in place upon the projecting arm by a check-nut screwed against it, thus preventing any lateral motion of the pinion-shafts.

The entire working mechanism of my churn can be easily and quickly detached. By loosening the check-nut which holds the spring supporter upon the projecting arm, and lifting the end of the spring which bears upon the end of the pinion-shafts, the latter are released so that they can be drawn out endwise.

A spring clutch, bearing upon the shaft of the driving-wheel near the hub, is used to throw the machinery out of gear, it being raised by the thumb and fingers, and the driving-wheel shaft drawn back so as to free the driving-wheel from the pinions, and bring the hub of it under the clutch, which is held down by a spiral spring working upon the upright stem attached to it.

The inner beater-rack can be removed by simply slipping out the inner shaft. The churn is then ready for gathering, which is done with the outside beater-rack, which is turned in the opposite direction from that used in churning the butter, the frame presenting a flat surface on the back part, while on the front it is beveled, in order to throw the cream toward the center, and to scrape the butter or cream from the sides while it is revolving. The handle or knob upon the lid has an air-tube running up through it, to admit the air, and prevent the cream from finding any outlet elsewhere.

In the drawings—

Figure 1 is a plan view of my churn, A representing the shell or box of the churn, which is of an oblong form, with square sides and ends, and a rounded or semicircular bottom, for convenience of getting out the butter, cleansing, &c.

B is the outer beater-rack, with beaters, *b*, fastened, at their outer ends, to the horizontal frame-pieces. Their inner ends are free.

In revolving, these beaters pass between beaters *c* on the inside beater-rack C, which revolves in the opposite direction. These racks are suspended horizontally at their ends in the churn-box A.

D is the driving-wheel, which meshes into the pinions E and F, which move in opposite directions.

The pinion E has simply a hollow sleeve or shaft attached to it, with a square end, which fits into a recess in the plate *m* on the end of beater-rack B.

The pinion-shaft of F is also formed square on its inner end, and fits into a recess in the plate *n* on rack C.

G is the crank-shaft on which the driving-wheel D is mounted. It runs through lugs or boxes *g*.

H is a spring clutch, formed with an upright stem, ending in a button or knob on the top of the arm *k*, through which it passes. Its lower end is semicircular in form, to fit upon the crank-shaft G, between the inner lug *g* and the hub of the driving-wheel D. It rests upon this while the process of churning is going on, after which it is raised up, the crank-shaft drawn partially out, so as to let the clutch rest on the hub of the driving-wheel.

The set-screw *p* on the outer end of the projecting arm *k* is loosened, the end of the spring supporter K resting on the end of the inner pinion-shaft *l* is raised and turned aside, and the inner shaft and pinion F drawn out, the inside beater-rack C removed, and the churn is ready for the process of gathering, which is done with the outer beater-rack, reversing the motion used in churning, the crank-shaft being pushed back into its former position, and the spring clutch let down again into place on the shaft, as shown in Figure 2, which shows an end view of my churn.

The beater-racks are shown in dotted lines B and C. The position of the spring supporter K is seen with its end, which is collared, to fit upon the outer end of the pinion-shaft *l*

I am aware that numerous double-geared churns have been invented, and I disclaim in my invention any portion which may be found in any other churn or like device; but What I do claim as new, and desire to secure by Letters Patent, is—

The arrangement of the crank-shaft G, hub d', driving-wheel D, pinions E and F, shafts l and m, boxes g, arm k, set-screw p, supporting spring K, spring clutch H, shell A, and beaters B and C, operated as described, for the purpose hereinbefore specified.

Witness my hand to this my application for a patent for an improvement in churns this 12th day of June, A. D. 1869.

J. P. MERANDA.

Witnesses:
B. C. CONVERSE,
I. ENGENSPERGER